United States Patent

Niiyama et al.

[11] Patent Number: 5,858,268
[45] Date of Patent: Jan. 12, 1999

[54] LIQUID CRYSTAL OPTICAL ELEMENT, A LIQUID CRYSTAL DISPLAY ELEMENT AND A PROJECTION TYPE LIQUID CRYSTAL DISPLAY APPARATUS

[75] Inventors: Satoshi Niiyama; Hiroshi Kumai, both of Yokohama, Japan

[73] Assignee: AG Technology Co., Ltd., Yokohama, Japan

[21] Appl. No.: 673,756

[22] Filed: Jun. 27, 1996

[30] Foreign Application Priority Data

Jun. 28, 1995 [JP] Japan ................................. 7-162576

[51] Int. Cl.$^6$ .......................... C09K 19/52; C09K 19/02; F21V 9/00
[52] U.S. Cl. ...................... 252/299.01; 252/582; 349/183
[58] Field of Search ................. 428/1; 252/582; 252/299.01; 349/183

[56] References Cited

U.S. PATENT DOCUMENTS

| | | | |
|---|---|---|---|
| 4,834,509 | 5/1989 | Gunjima et al. | 359/51 |
| 5,103,327 | 4/1992 | Hirai et al. | 359/51 |
| 5,150,232 | 9/1992 | Gunkima et al. | 359/51 |
| 5,196,952 | 3/1993 | Hirai et al. | 359/51 |
| 5,216,531 | 6/1993 | Hirai et al. | 359/52 |
| 5,235,445 | 8/1993 | Hirai et al. | 359/52 |
| 5,379,137 | 1/1995 | Hirai et al. | 359/51 |
| 5,386,306 | 1/1995 | Gunjima et al. | 359/52 |

*Primary Examiner*—C. H. Kelly
*Attorney, Agent, or Firm*—Oblon, Spivak, McClelland, Maier & Neustadt, P.C.

[57] ABSTRACT

A liquid crystal optical element comprising a pair of substrates with electrodes and a liquid crystal/polymer composite material which is composed of a liquid crystal and a polymer and interposed between the pair of substrates, wherein the polymer phase of the liquid crystal/polymer composite material is a polymeric cured product of a polymerizable curable material comprising an addition-polymerizable compound presented by the following formula (1):

$$CXY=CZ-CO-O-R-OH \qquad (1)$$

wherein each of X, Y and Z is —H or —CH$_3$, and R is a bivalent hydrocarbon group which has 4 to 8 carbon atoms in total and at least one carbon atom between the carbon atom bonded to the ester linkage and the carbon atom bonded to the hydroxyl group in the formula (1), and may have at least one linkage selected from the group consisting of an ether linkage, an ester linkage and a carbonate linkage, substituted for one or more carbon—carbon linkages.

12 Claims, 1 Drawing Sheet

LIQUID CRYSTAL OPTICAL ELEMENT, A LIQUID CRYSTAL DISPLAY ELEMENT AND A PROJECTION TYPE LIQUID CRYSTAL DISPLAY APPARATUS

BACKGROUND OF THE INVENTION

1. Field of the Invention

The present invention relates to a liquid crystal optical element wherein a composite material composed of liquid crystal and a polymer is interposed between a pair of substrates with electrodes, a liquid crystal display element and a projection type liquid crystal display apparatus using such element.

2. Discussion of Background

In recent years, liquid crystal displays have been widely used for personal word processors, hand-held computers, portable TV sets and so on by making use of advantages of low consumption rate of power, low voltage driving and so on. Of these liquid crystal displays, liquid crystal display elements having active elements which are excellent in viewing angle, of high speed response and capable of high density display, have particularly been noted and developed.

At the beginning, liquid crystal display elements (LCDs) of dynamic scattering type (DSM) have been proposed. However, such DSM-LCDs had a disadvantage of large current consumption because a high value of electric current passed in the liquid crystal. Now, LCDs of twisted nematic type (TN) using a polarizing plate have been widely used in markets as display elements for portable TVs or portable type information devices. Since the TN-LCDs have a very small leak current and a small power consumption rate, they are suitable for usage in which batteries are used as power sources.

In DSM-LCDs having active elements, the leak current of the liquid crystal itself is large. Accordingly, it was necessary to provide a large storage capacitance in parallel to each picture element, and the power consumption of the liquid crystal display elements themselves was large.

Since the leak current of the liquid crystal itself in the TN-LCDs is very small, it is unnecessary to provide a large storage capacitance, and the power consumption of the liquid crystal element itself can be small. However, there is a problem that the transmittance of light is small because two polarizing plates are required in the TN-LCDs. In particular, when a color filter is used to obtain a colored display, only several percents of incident light can be utilized. Accordingly, a strong power source is required, as a result of which power consumption rate is increased.

There are further problems that an extremely strong light source is required when a picture image is to be projected which causes difficulty in obtaining a high contrast ratio on a projection screen and which changes the operating condition of the liquid crystal display element due to heat from the power source.

In order to solve the above-mentioned problems, there has been proposed a liquid crystal/polymer composite material in which a nematic liquid crystal is dispersed and held in a matrix comprising polymer or the like, or a composite material comprising a continuous liquid crystal phase and a polymer in a network shape is formed. And by utilizing the scattering-transmitting characteristics, there has been obtained a liquid crystal display element capable of controlling turning-on and off of light directly without using any polarizing plate. Such liquid crystal display element is called a dispersion type liquid crystal display element or a polymer dispersion type liquid crystal display element. The basic construction and a method or producing the liquid crystal display element will be described.

A liquid crystal optical element includes a nematic liquid crystal having a positive dielectric anisotropy, and the refractive index of a polymer phase is made substantially in coincidence with the ordinary refractive index ($n_o$) of the liquid crystal. A liquid crystal/polymer composite material is interposed between a pair of substrates with electrodes.

Each of the substrates with electrodes is a substrate made of glass, plastics, ceramics or the like on which a transparent electrode such as ITO ($In_2O_3$—$SnO_2$), $SnO_2$ or the like is formed. A metallic electrode made of material such as Cr, Al or the like may be used in combination of the above-mentioned electrode, if necessary. When the electrodes are used for a reflection type operation mode, they can be used as reflection electrodes.

In the liquid crystal/polymer composite material, the refractive index of the liquid crystal is changed depending on a state of the application of a voltage across the substrates with electrodes. When the refractive index of the polymer phase substantially agrees with the refractive index of the liquid crystal, light is transmitted, while when they do not agree with each other, light is scattered. Since the liquid crystal optical element does not use a polarizing plate, a bright display is generally obtainable.

When a voltage is applied, liquid crystal molecules are aligned in parallel to a direction of electric field. Accordingly, it is easy to control the refractive indices, and a high transmittance is obtained in a light transmission state of the liquid crystal optical element.

Conventional techniques of the liquid crystal optical element using the liquid crystal/polymer composite material will be described.

Japanese Unexamined Patent Publication No. 271233/1988 (U.S. Pat. No. 4,834,509) (referred to as a conventional technique 1) discloses that a mixture of liquid crystal and a polymer material is produced by using a vinyl compound as the polymer material, specifically, an acryloyl compound containing urethane acrylate of high molecular weight, and the mixture is subjected to a photopolymerization phase separation process to form a polymer phase and a liquid crystal phase whereby a liquid crystal/polymer composite material of high performance can be formed. The publication also discloses that a light modulator of good appearance and high performance can be obtained by controlling light passing through the layer of liquid crystal/polymer composite material with an outer electric signal turned-on and off.

In the conventional technique 1, there is a proposal that a curable material including an —OH group-containing vinyl monomer which is 2-hydroxyethylacrylate (2-HEA), i.e., a compound expressed by the formula (1) which will be described hereinbelow, where R is an ethylene group, is used for the liquid crystal/polymer composite material. Formation of a cured product of a curable material comprising an —OH group-containing vinyl monomer as a polymer phase was an important technical factor in adjusting the interaction of contact at the interface between the liquid crystal phase and the polymer phase in the liquid crystal/polymer composite material so as to form a suitable phase separation structure.

Japanese Unexamined Patent Publication No. 196229/1986 (referred to as a conventional technique 2) discloses as general description a liquid crystal display element formed by combining a liquid crystal/polymer composite material layer comprising polymer and liquid crystal with an active matrix substrate.

The active matrix substrate is composed of a substrate on which electrodes and active elements such as thin film transistors (TFTs), thin film diodes, metal-insulation material-metal non-linear resistor devices (MIMs) or the like are formed. A single or a plurality of active elements are connected to each of the picture element electrodes. The counter electrode substrate is composed of a substrate on which a common electrode or a patterned electrode is formed, and the counter electrode substrate is combined with the active matrix substrate so as to be capable of providing a display.

In a case of using a three-terminal element such as TFT as the active element, a solid electrode used in common with all picture elements may be disposed on the counter electrode substrate. In a case of using a two-terminal element such as an MIM element or a PIN diode or the like, the counter electrode substrate is applied with a stripe-like patterning.

Further, as disclosed in Japanese Unexamined Patent Publication No. 33523/1989 (conventional technique 3), when a liquid crystal/polymer composite material is formed by photopolymerization, liquid crystal in the liquid crystal/polymer composite material is controlled to have a direction of orientation by applying an electric field from the outside whereby a normally transparent portion or a semi-transparent portion is previously formed. When a fixedly displayed portion is desirable, such normally transparent portion can be formed.

In the initially developed liquid crystal display elements provided with such liquid crystal/polymer composite materials as described in the conventional techniques 1 and 2, there was hysteresis in the voltage-transmission characteristics (V-T curves) in the electro-optical characteristics of the liquid crystal display elements. Although the hysteresis is negligible in a window or a shutter which is operable under the condition of applying two values, there was a problem that the transmission of light varies between a state that a driving voltage rises and a state that the driving voltage falls in a display element of high performance which requires to display a half tone. Accordingly, there was an image-sticking phenomenon wherein a picture image which had appeared in the display just before the changing of picture remained in the present display for several seconds.

In consideration of such problem, Japanese Unexamined Patent Publication No. 186535/1994 (U.S. Pat. No. 5,196,952) (referred to as a conventional technique 4) presents a propose concerning the physical values of a liquid crystal material and control of the structure of a polymer phase as a result of having paid attention to the physical values of the liquid crystal used and the spatial dispersion of liquid crystal domains in a liquid crystal cell, and discloses that the reduction of hysteresis to a required extent in a display element has been achieved. For instance, there is description that a combination of a refractive index anisotropy $\Delta n$ of liquid crystal of 0.18 or more and a dielectric anisotropy $\Delta \epsilon$ of 5–13 is preferable. Also, there is description that the shape of liquid crystal domains with a certain deformation and a random arrangement of liquid crystal in the liquid crystal cell contribute to the reduction of the hysteresis.

Japanese Unexamined Patent Publication No. 134238/1993 (U.S. Pat. No. 5,235,445) (referred to as a conventional technique 5) discloses that in considering the elasticity of a polymer phase used, a polymer material having an elasticity of $3 \times 10^7 N/m^2$ or lower at 20° C. and $1 \times 10^3 N/m^2$ or more at 40° C. should be used. It also describes that control of the elasticity of the polymer phase contributes greatly to the reduction of the hysteresis, and a beautiful display without an image-sticking can be obtained even when a moving picture is to be displayed.

In the conventional liquid crystal/polymer composite materials, however, there is a large temperature dependence in the voltage/transmission characteristics. In particular, the scattering power of the liquid crystal optical element decreases when the ambient temperature is in a low temperature range of 20° C. or less, and the hysteresis which is expressed by a difference of transmission between a voltage rise and a voltage fall in the voltage-transmission characteristics becomes large with the result of the problems that the contrast ratio of a displayed picture decreases and there results an image-sticking wherein a picture image which had appeared in the display just before the changing of picture remained in the present display for several seconds.

SUMMARY OF THE INVENTION

It is an object of the present invention to provide a liquid crystal optical element and a liquid crystal display element capable of maintaining a scattering power and providing a beautiful half-tone display of high contrast ratio even in a lower temperature region of 20° C. or less and capable of reducing an image-sticking phenomenon due to the hysteresis of the liquid crystal/polymer composite material.

In a first invention, there is provided a liquid crystal optical element comprising a pair of substrates with electrodes and a liquid crystal/polymer composite material which is composed of a liquid crystal and a polymer and interposed between the pair of substrates, wherein the polymer phase of the liquid crystal/polymer composite material is a polymeric cured product of a polymerizable curable material comprising an addition-polymerizable compound presented by the following formula (1):

$$CXY=CZ-CO-O-R-OH \qquad (1)$$

wherein each of X, Y and Z is —H or —CH$_3$, and R is a bivalent hydrocarbon group which has 4 to 8 carbon atoms in total and at least one carbon atom between the carbon atom bonded to the ester linkage and the carbon atom bonded to the hydroxyl group in the formula (1), and may have at least one linkage selected from the group consisting of an ether linkage, an ester linkage and a carbonate linkage, substituted for one or more carbon—carbon linkages.

In the liquid crystal optical element, for instance, the refractive index ($n_p$) of the polymer phase at the time of applying a voltage or applying no voltage is made substantially coincidence with the ordinary refractive index ($n_o$) or the extra-ordinary refractive index ($n_e$) of the liquid crystal used.

A second invention concerns the liquid crystal optical element according to the first invention wherein the ratio of the compound represented by the formula (1) to the total addition-polymerizable compounds in the polymerizable curable material is from 10 to 70 wt %.

A third invention concerns the liquid crystal optical element according to the first or the second invention wherein the compound represented by the formula (1) is a hydroxyl group-containing acrylate.

A fourth invention concerns the liquid crystal optical element according to any one of the first through the third inventions, wherein the polymerizable curable material further contains a high-molecular weight compound having at least one thermo- or photo-polymerizable functional group.

In accordance with a fifth invention, there is provided a liquid crystal display element comprising an active matrix substrate having an active element for each pixel electrode, a counter electrode substrate having a counter electrode and a liquid crystal/polymer composite material for the liquid crystal optical element defined in any one of claims 1 through 4 wherein the liquid crystal/polymer composite material is interposed between the active matrix substrate and the counter electrode substrate.

In accordance with a sixth invention, there is provided a projection type liquid crystal display apparatus comprising the liquid crystal display element defined in claim 5, a projection light source and a projection optical system.

In accordance with the present inventions having the features described above, there can be provided a liquid crystal optical element or a liquid crystal display element which minimizes an image-sticking phenomenon due to hysteresis even in a low temperature region, has a high contrast ratio and allows the driving with a low voltage.

The major object of the present invention is to provide a liquid crystal optical element capable of reducing an image-sticking phenomenon due to the hysteresis of the liquid crystal/polymer composite material and providing a display of high contrast ratio with a low driving voltage.

In the following, the structure in a microscopic view of the liquid crystal/polymer composite material will be described as well as the relation of it to the hysteresis.

The structure of the phase-separated polymer and liquid crystal is three-dimensional. The three-dimensional structure may be formed by introducing the liquid crystal into a large number of fine holes formed in the polymer phase; or the liquid crystal is impregnated into the polymer phase having a network structure; or a large number of microcapsules containing therein liquid crystal are dispersed in the polymer phase; or liquid crystal phases which are separated in a particle form are connected to each other in a three-dimensional space. The above-mentioned structure of three-dimensional phase separation can generally be classified into a continuous liquid crystal phase structure wherein 60–100% of liquid crystal phases are connected to or communicated with each other through the polymer phase, or a structure of phase separation wherein the proportion of the connected or communicated liquid crystal phases is 30% or less and the remaining liquid crystal phases are independent. In a phase-separated structure wherein the quantity of the interconnected liquid crystal phase is small, for example, the liquid crystal is phase-separated into a form of particle-like separate capsules, i.e., discrete liquid crystal capsules, the interface for generating the scattering performance is limited to the interface between the liquid crystal phase and the polymer phase. In such a case, in order to increase the scattering performance of the liquid crystal/polymer composite material, it is necessary to increase the number of phase-separated liquid crystal capsules. However, there is limitation with respect to spatial arrangement in order to increase the density of the capsules while the optimum average particle size of the capsules is maintained.

In comparing the discrete liquid crystal capsule structure with one where the liquid crystal is in the form of a continuous phase, the use of the continuous liquid crystal phase structure is preferable in order to obtain a liquid crystal optical element having a high haze value (low light transmission) in a scattering state and a high contrast ratio. The continuous liquid crystal phase structure allows for light scattering not only at the polymer/liquid crystal interface but also at the interfaces between the liquid crystal domains. It is known that in liquid crystal not under the influence of an electric field but in contact with a convex-concave surface, the liquid crystal exists in the form of randomly orientated domains which contribute to light scattering. It is believed that when the liquid crystal exists as a continuous phase in the polymer/liquid crystal composite there are significantly more liquid crystal domains than when the liquid crystal is in the form of discrete capsules.

In the conventional liquid crystal/polymer composite material, there appeared hysteresis in the voltage-transmittance characteristics, this resulting a problem in displaying a gray-scale image. The hysteresis is a phenomenon that transmittance is different between the course of increasing the voltage applied and the course of decreasing of the voltage. If hysteresis exists, information in the previous display remains in the gray-scale image. Namely, image-sticking occurs which deteriorates the quality of picture image.

As one of the causes which produces hysteresis in the liquid crystal/polymer composite material, there is the structure of the liquid crystal/polymer composite material wherein the liquid crystal is dispersed and held in the polymer phase or a plurality of domains are formed in a liquid crystal phase due to the existence of polymer. Namely, it is considered that there is the hysteresis caused by the interaction of the liquid crystal existing in a separate state in the polymer phase, and the interaction of the plurality of liquid crystal domains formed in the liquid crystal phase. The nature of the interaction between the polymer phase and the liquid crystal phase is different when the electric field is applied than when no electrical field exists. When no electrical field is applied, the interaction between the liquid crystal and the polymer is controlled by the surface tension which exists at the boundary. When an electrical field is applied, the interaction includes not only the boundary effects, but also the energy which is created by the rearrangement of the liquid crystal which occurs, i.e., the elastic energy.

The magnitude of the hysteresis is determined by an elastic energy stored in the dispersively held liquid crystal and the liquid crystal domains adjacent to each other, an electrical energy by an electric field applied from the outside, an energy by the interaction of the liquid crystal existing in a separated state in the polymer phase, and an energy by the interaction of the plurality of liquid crystal domains formed in the liquid crystal phase. Accordingly, the hysteresis can be reduced by optimizing the balance of energies, and an excellent display in which there is no image-sticking can be obtained even in a gray-scale display.

It is an object of the present invention to provide a liquid crystal optical element having a high contrast ratio a high degree of brightness, quick response and capable of reducing hysteresis. Further, it is to provide a liquid crystal optical element which can be driven with an active element and a driving circuit of the low voltage type.

The polymer phase contributes to stabilize the arrangement of liquid crystal, to store elastic energy, to stabilize the entire structure of the liquid crystal/polymer composite material and to adjust the interaction of contact to the liquid crystal. Material for the polymer phase is optimized in consideration of the above points.

The most important factors on the electro-optical characteristics are to store an elastic energy and the interaction between the liquid crystal and the polymer phase, i.e., surface tension at the liquid crystal/polymer boundary, which are closely related to the hysteresis on the voltage-transmittance characteristics of the liquid crystal/polymer composite material which is a cause of image-sticking of picture in a half-tone display, responding speed at a voltage variation time and reproducibility of the transmittance characteristics.

In particular, it is indispensable to minimize the hysteresis of the liquid crystal polymer composite material in order to obtain a fine half-tone display, which is an important factor. Further, since the polymer phase is related to the stabilization of individual liquid crystal particles or the liquid crystal domains or the stabilization of the entire structure of the liquid crystal/polymer composite material, it is required to determine the material of polymer phase in consideration of the surface tension with the liquid crystal and the elasticity of the polymer phase.

In the compound of the formula (1), R represents a hydrocarbon group such as an alkylene group. The hydrocarbon group may be an alkylene group which has at least one linkage selected from the group consisting of an ether linkage, an ester linkage and a carbonate linkage, substituted for one or more carbon—carbon linkages. R is preferably a residue of a diol from which two hydroxyl groups are removed.

In the present invention, the carbon number of R in the formula (1) must be from 4 to 8. If the carbon number is larger or smaller, the object of the present invention can not be attained. As R, preferred are residues of various diols from which two hydroxyl groups are removed. R may be a cycloalkylene group or a linear hydrocarbon group having a cycloalkyl group or a cycloalkylene group.

Further, R may be a linear hydrocarbon group containing a phenyl group or a phenylene group. However, R is preferred not to contain such a hydrocarbon ring. As described above, R also may be a linear hydrocarbon group having an ether linkage, an ester linkage or a carbonate linkage substituted for a carbon—carbon linkage. In this case, the carbon atom in an ester linkage or a carbonate linkage is counted among the carbon number of R.

When R does not have any of the above-mentioned linkages such as an ether linkage, R is a residue of an ordinary dihydric alcohol. As the dihydric alcohol, various $C_{4-8}$ dihydric alcohols may be mentioned. The dihydric alcohols may be linear or branched. The hydroxyl groups may be primary, secondary or tertiary hydroxyl groups.

As a diol having at least one ether linkage, a polymeric glycol such as a dialkylene glycol or a trialkylene glycol, a diol monoepoxide adduct obtainable by adding a monoepoxide such as ethylene oxide or propylene oxide to a diol may be mentioned.

As a dial having at least one ester linkage, a diester of one molecule of a dicarboxylic acid with two molecules of a diol, such as a cyclic ester adduct of a dihydric alcohol obtainable by adding a cyclic ester such as caprolactone to a dihydric alcohol may be mentioned.

As a diol having a carbonate linkage, a cyclic carbonate adduct of a dihydric alcohol obtainable by adding a cyclic carbonate such as ethylene carbonate to a dihydric alcohol may be mentioned.

Both X and Y in the formula (1) are preferably hydrogen atoms, because in this case, the compound of the formula (1) is highly polymerizable. In this case, the unsaturated carboxylic acid residue ($CH_2$=CH—CO—O—) wherein Z is a hydrogen atom is an acryloyloxy group, and when Z is a methyl group, the unsaturated carboxylic acid residue is a metacryloyloxy group.

When the curing is effected by photopolymerization as discussed later, a highly photopolymerizable acryloyloxy group is preferred. In the case of thermal polymerization, the unsaturated carboxylic acid residue may be a metacryloyloxy group or those having a methyl group as X or Y. Compounds of the formula (1) having an acryloyloxy group as the unsaturated carboxylic acid residue will be discussed hereinafter. However, as mentioned above, the compound of the formula (1) should not be limited to those specific examples.

Hereinafter, specific examples of the compound of the formula (1) having an acryloyloxy group are given.

Examples of the vinyl monomer of the formula (1) wherein R is a mere hydrocarbon group such as an alkylene group having a total carbon number of from 4 to 8, are given below. Provided that A in the following formula is an acryloyloxy group ($CH_2$=CH—CO—O—), when the total carbon number of R is 4, the following substances under Ka 3 are given as examples. Similarly, when the total carbon number is 5, 6, 7 and 8, the substances under Ka 4, Ka 5, Ka 6 and Ka 7 are given respectively as examples.

| Ka 3 | |
|---|---|
| A—$(CH_2)_4$OH | (4-hydroxylbutyl acrylate) |
| A—$CH(CH_3)CH_2CH_2OH$ | (1-methyl-3-hydroxylpropyl acrylate) |

| Ka 4 | |
|---|---|
| A—$(CH_2)_5$OH | (5-hydroxypentyl acrylate) |
| A—$CH(CH_3)CH_2CH(OH)CH_3$ | (1-methyl-3-hydroxybutyl acrylate) |

| Ka 5 | |
|---|---|
| A—$(CH_2)_6$OH | (6-hydroxyhexyl acrylate) |
| A—$CH(CH_3)CH_2CH_2CH(OH)CH_3$ | (1-methyl-4-hydroxypentyl acrylate) |
|  | (2-ethyl-2-methyl-3-hydroxypropyl acrylate) |

| Ka 6 | |
|---|---|
| A—$(CH_2)_7$OH | (7-hydroxylheptyl acrylate) |
| A—$C(CH_3)_2CH_2C(CH_3)(OH)CH_3$ | (1,1,3-trimethyl-3-hydroxy-butyl acrylate) |
| A—$CH_2C(CH_2CH_2CH_3)(CH_3)CH_2OH$ | (2-methyl-2-hydroxymethyl-pentyl acrylate) |

| Ka 7 | |
|---|---|
| A—$(CH_2)_8$OH | (8-hydroxyoctyl acrylate) |
| A—$CH_2CH(CH_2CH_3)CH(OH)(CH_2)_2CH_3$ | (2-ethyl-3-hydroxyhexyl acrylate) |

When R has at least one ether linkage and has a carbon number of 4, A—$(CH_2)_2$—O—$(CH_2)_2$OH (diethylene glycol monoacrylate) is given as an example.

Similarly, when the carbon number is 6, A—$(CH_2)_2$—O—$(CH_2)_2$—O—$(CH_2)_2$OH (triethylene glycol monoacrylate) and A—$CH_2CH(CH_3)$—O—$CH_2CH(CH_3)$OH (dipropylene glycol monoacrylate), and when the carbon number is 8, A—$(CH_2)_2$—O—$(CH_2)_2$—O—$(CH_2)_2$—O—$(CH_2)_2$OH (tetraethylene glycol monoacrylate) and A—$(CH_2)_4$—O—$(CH_2)_4$OH (ditetramethylene glycol monoacrylate) are given as examples.

As a compound wherein R has at least one ester linkage and a carbon number of 8, A—$(CH_2)$—O—$CO(CH_2)_5$OH (2-hydroxylethyl acrylate-monocaprolactone adduct) may, for example, be mentioned.

The compound expressed by the formula (1) has R of appropriate length and an —OH group as a polar site, which are preferred to optimize the interaction of contact between the liquid crystal phase and the polymer phase in forming the liquid crystal/polymer composite material. Further, in the liquid crystal/polymer composite material, the glass transition temperature of the polymer itself is low; the elastic energy is sufficient to provide a high scattering power even in a low temperature region and the hysteresis can be reduced. Further, a display panel which shows a display of high contrast ratio without any image-sticking phenomenon even when driven with active elements can be obtained.

As disclosed in the conventional technique 1, a cured product of an —OH group-containing addition-polymerizable compound such as 2-HEA was used for the liquid crystal/polymer composite material. This is a basic technique in order to obtain an appropriate phase separation structure by adjusting the interaction of contact at the interface between the liquid crystal phase and the polymer phase in the liquid crystal/polymer composite material.

However, in 2-HEA, considering the —OH group as a polar site, the carbon number of the alkylene group, as a non-polar site, in the ester forming residue is only two whereby the polarity of the cured product is high, and accordingly, it is difficult to control the phase separation structure at the interface between the liquid crystal phase and the polymer phase. Further, since the glass transition temperature of the polymer is high, the hysteresis increases in a low temperature region.

In extensive study of the magnitude of the non-polar site in comparing the —OH group in a cured product of an —OH group-containing addition-polymerizable compound used for the liquid crystal/polymer composite material, there has been found that in a compound having R of a small carbon number like 2-HEA, the ratio of the polar site is extremely high, hence, the polarity of the cured product is high. Accordingly, it was difficult to form a stable phase separation structure at the interface between the liquid crystal phase and the polymer phase. Thus, the contrast of the obtained liquid crystal/polymer composite material was low in a low temperature region of 20° C. or less, and the hysteresis was large.

Further, the ratio of the polar site in a cured product of an addition-polymerizable compound is reduced as the carbon number of R increases. However, when the polarity of the polymer is too low, the liquid crystal is partially dissolved in the cured polymer whereby a voltage for driving the liquid crystal/polymer composite material is increased, and the contrast ratio is low.

Namely, it has been found that the ratio of the non-polar site to the polar site of the polymer phase in the liquid crystal/polymer composite material comprising a cured product of the compound expressed by the formula (1) of the present invention is suitable for adjusting the interaction of contact at the interface between the liquid crystal and the polymer; an excellent phase separation structure can be formed; a high contrast is obtainable with a low driving voltage, and the hysteresis in a lower temperature region is small.

The polymerizable curable material used in the present invention contains the compound of the formula (1). The ratio of the compound of the formula (1) in the total polymerizable curable material is preferably from 10 to 70 wt %, more preferably from 15 to 50 wt %. If the ratio is more than 70 wt %, the mixture of a polymerizable curable material and a liquid crystal before curing might have a problem in the compositional stability, depending on the type of the liquid crystal, due to the excessively high density of —OH groups in the polymer phase. If the ratio is too low, the effects of the present invention will be diminished.

The polymerizable curable material in the present invention contains another polymerizable curable compound besides the compound of the formula (1) (hereinafter referred to as a curable compound). The curable compound is preferably a compound copolymerizable with the compound of the formula (1). However, it is not limited thereto and may, for example, be a compound which is not copolymerizable with the compound of the formula (1) but polymerizable and curable on its own.

Such curable compounds have at least one curing site. As a curing site, an acryloyl group, a metacryloyl group, a vinyl group, an epoxy group or a thiol group may, for example, be mentioned. Preferably, a compound having a curing site copolymerizable with the compound of the formula (1), such as an acryloyl group or a metacryloyl group, is used. Particularly preferred is a highly photo-curable compound having an acryloyl group, which will be described below. Such a compound having an acryloyl group will be described below.

As a curable compound having an acryloyl group, various compounds other than the compound of the formula (1) may be used. Particularly preferred are acrylates having no —OH group. Such an acrylate may be relatively low-molecular weight compound such as an alkyl acrylate or a high-molecular weight compound such as a so-called acrylurethane. Particularly, at least part of the curable compound is preferably a high-molecular weight compound.

The above-mentioned compound having an acryloyl group has preferably at least one acryloyl group, more preferably from 1 to 4 acryloyl groups, most preferably from 1 to 2 acryloyl groups. In the case of a high-molecular weight compound, the number of acryloyl groups, is preferably from 2 to 4.

As a curable compound having an acryloyl group, an acrylates of a monohydric alcohol or a polyhydric alcohol is preferred. As an acrylate of a monohydric alcohol, an acrylate of a $C_{1-22}$ alkanol may, for example, be mentioned. Specifically, methyl acrylate butyl acrylate, 2-ethylhexyl acrylate, octyl acrylate, dodecyl acrylate, hexadecyl acrylate and behenyl acrylate may be mentioned.

Further, acrylates of various monohydric alcohols such as a cycloalkyl alcohol, a cycloalkyl-substituted alkanol, an aryl group-substituted alcohol and a heterocyclic ring-containing alcohol like tetrahydrofurfuryl alcohol may be mentioned. Acrylates of an alkanol substituted with a halogen such as fluorine or chlorine may be used.

As an acrylate of a polyhydric alcohol, polyacrylates of a polyhydric alcohol in which all the hydroxyl groups are esterified, are preferred. Specifically, ethylene glycol diacrylate, propylene glycol diacrylate, dipropylene glycol diacrylate, butanediol diacrylate, octanediol diacrylate, glycerin triacrylate and pentaerythritol tetraacrylate may, for example, be mentioned.

The curable compound having an acryloyl group may be a relatively high-molecular weight compound. For example, a monoacrylate or a polyacrylate of a relatively high-molecular weight polyol such as a polyether polyol, a polyester polyol or a polycarbonate polyol may, for example, be mentioned. A urethane bond-containing acrylate obtainable by using these polyols is also preferred. Specifically, as the urethane bond-containing acrylate, a reaction product of three compounds, a polyol, a polyisocyanate compound and a hydroxy group-containing acrylate such as 2-HEA, is preferred.

As the polyisocyanate compound, aliphatic diisocyanates, alicyclic diisocyanates, non-yellowing aromatic diisocyanates, their modified products of prepolymer type and of other types may, for example, be mentioned. The molecular weight of the high-molecular weight acrylate is preferably from 500 to 50,000 in view of the uniformity of phase separation upon curing, the diffusibility of the liquid crystal and the stability of the system.

The polymerizable curable material in the present invention is preferably a mixture containing at least three components, the compound of the formula (1), a low-molecular weight acrylate and a above-mentioned high-molecular weight acrylate (particularly, such having at least two acryloyl groups). The amount of the high-molecular weight acrylate in the polymerizable curable material is preferably at least 5 wt %, more preferably at least 10 wt %. Also, the amount of the low-molecular weight acrylate is preferably at least 5 wt %, more preferably at least 10 wt %. By virtue of the combined use of these curable compounds, the stability of the mixture of the polymerizable curable material and a liquid crystal improves, and the the phase separation of the liquid crystal upon curing of the polymerizable curable material can be controlled, whereby an excellent liquid crystal/polymer composite material can be formed.

The polymerizable curable material in its uniform mixture with a liquid crystal is cured, while the liquid crystal is separated out of the cured product, or the cured product is separated out of the liquid crystal so that a phase-separated structure of the liquid crystal and the polymer (the cured product of the polymerizable curable material) is formed to obtain a liquid crystal/polymer composite material.

Although the polymerizable curable material may be cured by thermopolymerization, it is preferably cured by energetic rays such as ultraviolet rays or electron rays, more preferably by polymerization using ultraviolet rays, to diminish the effect of heat on the liquid crystal. Therefore, a photopolymerization initiator or a photopolymerization promoter is preferably incorporated in the polymerizable curable material.

The liquid crystal optical element provided with the liquid crystal/polymer composite material is mainly used as a liquid crystal display element by which a person can observe a display. It can also be used as a light controllable window or an optical shutter by utilizing a flat electrode or a driving method such as simple matrix. The liquid crystal display element can be used not only as a direct view type display element but also a projection type display element. When the liquid crystal display element is used as the direct view type display element, a display apparatus may be constituted in combination of a back light, a lens, a prism, a mirror, a diffusion plate, a light absorbing material, a color filter and so on in accordance with the display characteristics which are desired to obtain.

Further, an infrared ray cut filter or a UV-ray cut filter or the like may be used in a lamination form, or characters, figures or the like may be printed, or a plurality of liquid crystal optical elements may be used.

Further, in the present invention, a protective plate such as a glass plate, a plastic plate or the like may be overlaid at the outside of the liquid crystal optical element. The protective plate reduces a danger of breakage of the optical element even when the surface of the element is pushed, whereby the safety of the optical element is improved.

The liquid crystal display element of the present invention is, in particular, suitable for a projection type display. The liquid crystal display element can be combined with a projection light source, a projection optical system and so on to constitute a projection type liquid crystal display apparatus. The projection light source and the projection optical system may be a conventional projection light source and a conventional projection optical system such as a lens or the like. Generally, the liquid crystal display element is arranged between the projection light source and a projection lens.

For instance, when three liquid crystal display elements are used for a projection type liquid crystal display apparatus wherein three kinds of light (R, G and B) are caused to pass through each liquid crystal display element, the characteristics of each of the liquid crystal elements should be uniformly adjusted for each color by adjusting the particle diameter of liquid crystal or the averaged size of the liquid crystal domains for each color, the inter-substrate gap, the refractive index of the liquid crystal and so on.

Liquid crystal to be incorporated into the liquid crystal/polymer composite material may be a nematic liquid crystal or a smectic liquid crystal. In particular, the nematic liquid crystal is preferably used. Further, a cholesteric liquid crystal may be added, or a dichroic dye or a single coloring matter may be added.

In addition, a viscosity-regulating agent, a spacer such as alumina particles, ceramic particles, plastic particles or glass fibers and other additives may be incorporated, as far as these do not adversely influence to the performance of the present invention.

It is preferable that in a state of applying a voltage, $n_p$ of the polymer phase (after curing) agrees with $n_o$ of the liquid crystal used.

In this case, a high transmittance is obtainable when the refractive index of the polymer phase substantially agrees with the refractive index of the liquid crystal phase. When they do not agree with each other, light is scattered (opaque).

In a light transmission state, the transmittance of the liquid crystal optical element using the liquid crystal/polymer composite material is high, and the haze value in a scattering state is not less than 80%.

In the present invention, the transmittance in the light transmission state is increased by rendering the refractive index of the liquid crystal phase to be in agreement with that of the polymer phase at the voltage application time. For this, a nematic liquid crystal having a positive dielectric anisotropy is used so that $n_o$ of the liquid crystal is substantially in agreement with the refractive index $n_p$ of the polymer phase. Then, a high transparent state is obtainable at the time of applying a voltage. Specifically, it is preferable to satisfy the relation of $n_o-0.03<n_p<n_o+0.05$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
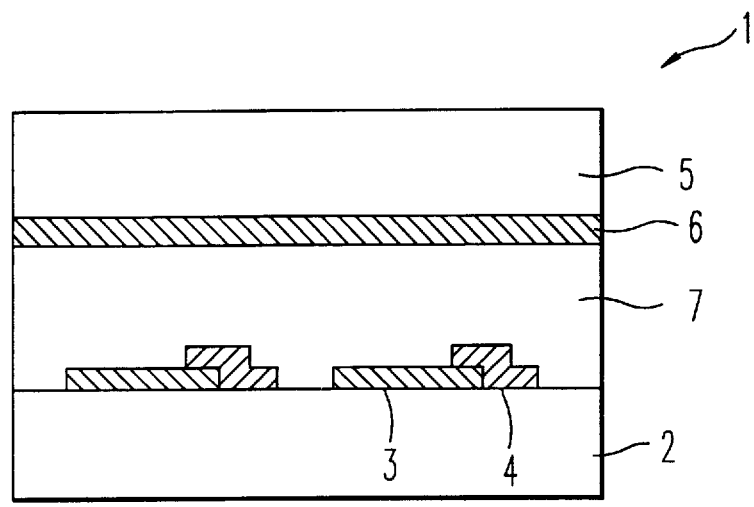
FIG. 1 is a cross-sectional view of an embodiment of the liquid crystal optical element of the present invention.

Preferred embodiments of the present invention will be described with reference to the drawings wherein the same reference numerals designate the same or corresponding parts.

FIG. 1 is a cross-sectional view showing an embodiment of the liquid crystal display element of the present invention in which an active matrix substrate is used.

In FIG. 1, reference numeral 1 designates a liquid crystal display element, numeral 2 designates a substrate such as glass, plastics or the like which is used as an active matrix substrate, numeral 3 designates a picture element electrode such as ITO, $SnO_2$ or the like, numeral 4 designates an active element such as a transistor, a diode, a non-linear resistance element or the like, numeral 5 designates a substrate such as glass, plastics or the like which is used as a counter electrode substrate, numeral 6 designates a counter electrode such as ITO, $SnO_2$ or the like, and numeral 7 designates a liquid crystal/polymer composite material interposed between the substrates. A full colored display is to be effected with a single plate-type liquid crystal display element, color filters for R, G and B and black masks are used.

Figure 2:
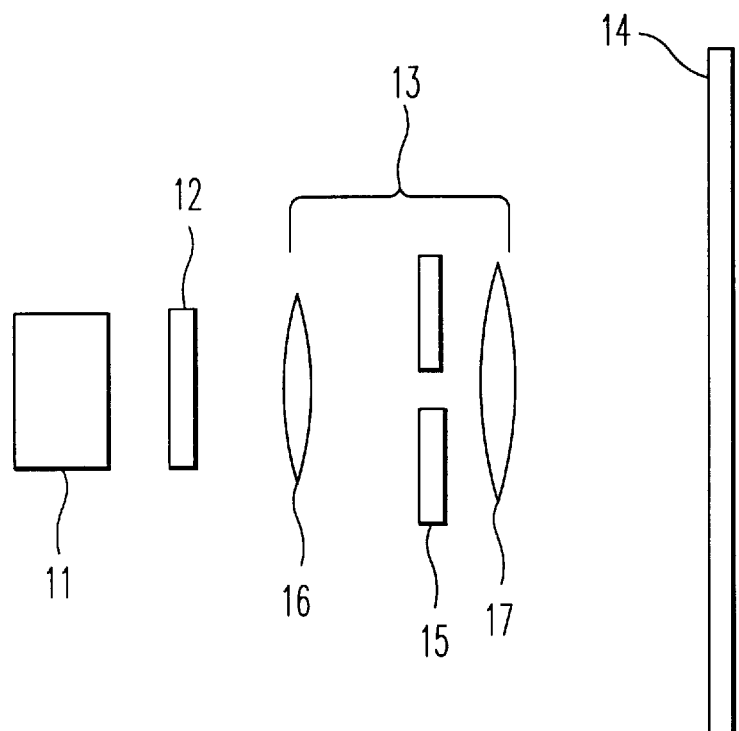
FIG. 2 is a diagram in a form of model of an embodiment of the projection type liquid crystal display apparatus.

FIG. 2 is a diagram showing an embodiment of the projection type liquid crystal display apparatus in which the liquid crystal display element as shown in FIG. 1 is used.

In FIG. 2, reference numeral 11 designates a projection light source system, numeral 12 designates a liquid crystal display element, numeral 13 designates a projection optical system including a lens, an aperture or the like, and numeral 14 designates a projection screen.

In this embodiment, the projection optical system includes an aperture or a spot 15 which is a hollowed plate, a focussing lens 16 and a projection lens 17.

In a case of using a three-terminal element such as TFT as the active element, a solid electrode used in common with all picture elements may be disposed on the counter electrode substrate. In a case of using a two-terminal element such as an MIM element or a PIN diode or the like, the counter electrode substrate is applied with a stripe-like patterning.

As a device for reducing diffusion light, it is preferred to use such a device that among incident light passing through the liquid crystal optical element, straight-forward light (light which has transmitted through portions in which the picture element portions are in a transparent state) is taken, and non-straight-forward light (light scattered at portions in which the light crystal/polymer composite material is in a scattering state) is diminished. In particular, the device which does not reduce the straight-forward light but reduces diffusion light is preferred.

Specifically, as shown in FIG. 2, a projection type liquid crystal display apparatus is provided with a liquid crystal display element and a projection optical system which include a liquid crystal display element 12, a focussing lens 16, an aperture or a spot 15 made of a hollowed plate and a projection lens 17.

In the operation of the apparatus, light emitted from the projection light source passes through the liquid crystal display element 12. Among the light passing through the display element 12, straight-forward light in the incident light is collected by the focussing lens 16; the collected light is passed through an opening formed in the aperture to the spot 15 and the projection lens 17 and is projected on a projection screen. On the other hand, light which is not straight forward and scatters at the liquid crystal display element 12 does not pass through the opening formed in the aperture or the spot 15 even though it is collected by the focussing lens 16. Accordingly, scattered light is not projected, and the contrast ratio can be improved.

As another embodiment, a mirror having a small surface area is arranged obliquely at the same position, instead of the aperture or the spot 15. Light reflected by the mirror is projected through a projection lens disposed on the optical axis of the mirror. Further, a spot or mirror or the like may be disposed at a position where light beams are focused by a projection lens, without using the focussing lens. The focal length or the diameter of the projection lens may be suitably selected so as to remove scattering light, without using an especially arranged aperture.

Further, a micro lens system can be used. Specifically, a combination of a micro lens array and a spot array in which fine holes are formed in array may be disposed at the side of the projection optical system with respect to the liquid crystal display element to thereby remove needless scattering light. This arrangement has an advantage of reducing the entire size of the projection type display apparatus because the optical path length necessary for removing scattering light can be remarkably shortened. In order to reduce the optical path length, the installation of a scattering light removing system in the projection optical system is effective way. The structure of projection type display apparatus in which the scattering light removing system is installed in the projection optical system is simpler than the structure in which the projection optical system and the scattering light removing system are independently disposed, whereby the entire size of the apparatus can be reduced.

These systems may be used in combination with a mirror, a dichroic mirror, a prism, a dichroic prism, a lens and so on to synthesize a picture image and to display a colored image. Further, a colored picture image is obtainable by combining the optical system with a color filter.

The ratio of the scattered light component to the straight-forward light component reaching on the projection screen can be controlled by adjusting the diameter of the spot or the mirror and the focal length of the lens, so that a desired contrast ratio of display and the brightness in display can be obtained.

When the apparatus for reducing diffusion light as shown in FIG. 2 is used, light entering from the projection light source to the liquid crystal display element should be parallel in order to increase the brightness of display. For this, it is preferable to constitute a projection light source by combining a light source capable of providing high brightness (which should be a point light source), a concave mirror, a condenser lens and so on.

Description has been made mainly as to the transparent type display apparatus. However, the present invention is applicable to a projection type liquid crystal display apparatus having a structure of reflection type. For instance, a small mirror is disposed, instead of a spot, to take out only necessary light.

In FIG. 2, an embodiment of a structure using a single plate system is shown. However, the present invention is applicable to a structure of three plate system for R, G and G as disclosed in Japanese Unexamined Patent Publication No. 134295/1995 (transmitting type) or Japanese Unexamined Patent Publication No. 5419/1995 (reflection type). In this case, light from a white light source is split into color lights R, C and B; a liquid crystal is provided for each of the color lights and the split color lights are synthesized whereby efficiency of utilization of light is improved.

Now, the present invention will be described in detail with reference to Examples. However, it should be understood that the present invention is by no means restricted by such specific Examples.

EXAMPLE 1

A bifunctional acrylurethane which is a reaction product of polypropylene glycol having a molecular weight of about 1,000, trimethylhexamethylene diisocyanate and 2-HEA, 2-ethylhexyl acrylate and 4-hydroxybutyl acrylate were mixed in a weight ratio of 5:2:3 to prepare a polymerizable curable material. Then, a slight amount of a photopolymerization initiator has added thereto. A liquid crystal having physical properties of $\Delta n=0.215$, $\Delta\epsilon=12.0$, $K_{33}=1.2\times10^{-11}$ and $\eta=25$ cSt at 25° C. was uniformly dissolved in the material so that the ratio of the liquid crystal would be 62%.

An active matrix substrate on which a TFT of polycrystalline silicon was formed for each picture element and a counter electrode substrate on which a flat electrode was formed are sealed with a sealing material arranged at the peripheral portion to form a cell having a substrate gap of 10 μm. Into the cell, an uncured mixture of the liquid crystal and the polymerizable curable material was injected, followed by UV light exposure to form a liquid crystal/polymer composite material. $n_p$ of the polymer substantially agreed with $n_o$ of the liquid crystal. A liquid crystal display element including the liquid crystal/polymer composite material was combined with a projection light source and a projection optical system to prepare a projection type liquid crystal display apparatus. Light fluxes of about 800,000 luxes were irradiated to the liquid crystal display element in a room having a room temperature of 28° C. to effect a projection of picture image on a screen. During the projection, the liquid crystal display element was cooled with a cooling fan disposed in the projection type liquid crystal display apparatus so that an average temperature in the liquid crystal display element was adjusted to about 40° C. The contrast on the screen obtained by a driving voltage of about 8 V and a cone angle of projection optical system of 5° was about 65. The liquid crystal display element was driven with video signals, and a dynamic picture image having little image-sticking was obtained even at the time of switching a picture image.

The temperature of the room was adjusted to 15° C., and light fluxes of about 800,000 luxes were irradiated to the liquid crystal display element of the projection type liquid crystal display apparatus to conduct a projection of a picture image on the screen. In this case, the liquid crystal display element was cooled with the cooling fan disposed in the projection type liquid crystal display apparatus to adjust the average temperature of the liquid crystal display element to about 20° C. The contrast on the screen obtained by a driving voltage of about 8 V and a cone angle of projection optical system of 5° was 75. The liquid crystal display element was driven with video signals and a dynamic picture image having little image-sticking was obtained even at the time of switching a picture image.

COMPARATIVE EXAMPLE 1

A liquid crystal display element was obtained by preparing an uncured mixture for the liquid crystal/polymer composite material in the same manner as in Example 1 except that 2-hydroxypropyl acrylate was used instead of 4-hydroxylbutyl acrylate.

A projection type liquid crystal display apparatus was prepared in the same manner as in Example 1, and a picture image was projected on a screen in a room of room temperature of 28° C. in the same conditions as in Example 1. The contrast on the screen under the conditions of a driving voltage of about 8 V, a cone angle of projection optical system of 5° and an average temperature of liquid crystal display element of about 40° C., was 80. The liquid crystal display element was driven with video signals, and a dynamic picture image having little image-sticking was obtained even at the time of switching a picture image.

In the same manner as in Example 1, the average temperature of the liquid crystal display element was adjusted to about 20° C. in the room of room temperature of 15° C. The contrast on the screen on the liquid crystal display element was reduced to 22. When the display element was driven with video signals, an image-sticking phenomenon of the previous picture image took place at the time of switching the picture image due to the hysteresis on the voltage-transmittance characteristics.

EXAMPLE 2

A liquid crystal display element was obtained in the same manner as in Example 1 except that 6-hydroxylhexyl acrylate was used instead of 4-hydroxybutyl acrylate to prepare a liquid crystal/polymer mixture in an uncured state.

EXAMPLE 3

A liquid crystal display element was obtained in the same manner as in Example 1 except that 2-hydroxyethyl acrylate modified with caprolactone (having one molecule of split caprolactone added thereto) was used instead of 4-hydroxybutyl acrylate to prepare a liquid crystal/polymer mixture in an uncured state.

COMPARATIVE EXAMPLE 2

A liquid crystal display element was obtained in the same manner as in Example 1 except that 2-hydroxyethyl acrylate was used instead of 4-hydroxylbutyl acrylate to prepare a liquid crystal/polymer mixture in an uncured state.

COMPARATIVE EXAMPLE 3

A liquid crystal display element was obtained in the same manner as in Example 1 except that 10-hydroxydecyl acrylate was used instead of 4-hydroxybutyl acrylate to prepare a liquid crystal/polymer mixture in an uncured state.

COMPARATIVE EXAMPLE 4

A liquid crystal display element was obtained in the same manner as in Example 1 except that 2-hydroxyethyl acrylate modified with caprolactone (having two molecules of split caprolactone added thereto) of the formula (1) wherein the carbon number of R is 14, was used instead of 4-hydroxybutyl acrylate to prepare a liquid crystal/polymer mixture in an uncured state.

COMPARATIVE EXAMPLE 5

A liquid crystal display element was obtained in the same manner as in Example 1 except that n-hexyl acrylate was used instead of 4-hydroxybutyl acrylate to prepare a liquid crystal/polymer mixture in an uncured state.

These liquid crystal display elements were combined with the same projection light source and projection optical system as used in Example 1 to form projection type liquid crystal display apparatuses. A picture image was projected on a screen by irradiating light fluxes of about 800,000 luxes to the liquid crystal display elements in a room of a room temperature of 15° C. During that time, the liquid crystal display elements were cooled with a cooling tan provided in the projection type liquid crystal display apparatuses to adjust an average temperature of the liquid crystal display elements to about 20° C.

The contrasts on the screen of these liquid crystal display elements obtained by a driving voltage of about 8 V and a cone angle of projection optical system of 50°, and occurrence or non-occurrence of an image-sticking phenomenon at the time of switching the picture image when the liquid crystal display elements were driven with video signals, are shown in Table 1. Hysteresis values in Table 1 indicate voltage differences ($V_{RMS}$) between applied voltage values at the time of increasing voltage and applied voltage value at the time of decreasing voltage where the transmittance is (transmittance at the time of applying no voltage+saturated transmittance at the time of applying voltage)/2 in the voltage-transmittance characteristics of the liquid crystal display element.

TABLE 1

| Examples | Carbon atoms of R in formula (1) | Contrast | Image-sticking phenomenon | Hysteresis value |
|---|---|---|---|---|
| Example 1 | 4 | 75 | Not occurred | 0.12 |
| Example 2 | 6 | 70 | Not occurred | 0.18 |
| Example 3 | 8 | 80 | Not occurred | 0.13 |
| Comparative Example 1 | 3 | 22 | Occurred | 0.90 |
| Comparative Example 2 | 2 | 10 | Occurred | 0.72 |
| Comparative Example 3 | 10 | 25 | Slightly occurred | 0.52 |
| Comparative Example 4 | 14 | 30 | Slightly occurred | 0.35 |
| Comparative Example 5 | containing no —OH group 6 | 5 | Occurred | 0.78 |

In the liquid crystal optical element of the present invention, an improved liquid crystal/polymer composite material which controls electrically a scattering state and a transmitting state, is interposed between a pair of substrates with electrode. By choosing a polymerizable curable material for the liquid crystal/polymer composite material, the structure of the liquid crystal/polymer composite material can be controlled precisely and stably, whereby a scattering characteristic can be greatly improved without decreasing the transmittance of light. The liquid crystal/polymer composite material having optimized optical characteristics; i.e., a spatial structure that liquid crystal phases which are phase-separated from a polymer phase are connected in a three-dimensional space, or a spatial structure that a polymer of three-dimensional network form which deposits in liquid crystal forms a plurality of domains, can be formed.

Further, selection of a polymer material permits to control each state before and after the polymerization phase separation. In particular, when photopolymerization phase separation is used, compatibility of a mixture of liquid crystal and a polymer material (a cured product of a photocurable material) becomes stable, and an injection process of liquid crystal to an empty cell and a curing process by the light irradiation can be controlled stably.

Further, the formed liquid crystal/polymer composite material can have a desired fine structure which is preferred in an electro-optical sense. It is because the interaction of the liquid crystal phase and the polymer phase at the interface during the phase separation is appropriately controlled due to the elasticity and the polarity which are derived from the molecular structure of the polymer material used.

There is obtainable a projection type liquid crystal display apparatus wherein hysteresis in the liquid crystal/polymer composite material can be reduced in a wide temperature range, i.e., in a lower temperature than the normal temperature, which could not be easily obtained, and a beautiful half tone display is provided without any image-sticking phenomenon. Specifically, the projection type liquid crystal display apparatus provides excellent operational characteristics in an ambient temperature range of +15°–40° C. when light fluxes of about more than 500,000 luxes are irradiated.

Further, the liquid crystal optical element of the present invention provides a display of high contrast and high brightness even when it is driven by a voltage (~10 V) with a conventional driving IC for TN-LCD.

Further, in accordance with the present invention, a beautiful gray scale display of half tone can be effected even when a gray scale driving is conducted, and an image-sticking phenomenon due to hysteresis can be reduced.

Accordingly, the liquid crystal optical element of the present invention is effective to a projection type display for a picture image of high brightness and a bright projection type display of high contrast is obtainable without image-sticking. Further, a light source can be minimized.

Further, there are advantages that the wavelength dependence on the optical characteristics is small and color correction for the light source is unnecessary since no polarizing plate is used. Further, problems of an aligning treatment such as rubbing which is essential for TN-LCD or destruction of active elements due to static electricity which may be caused by the aligning treatment can be eliminated. Accordingly, yield of producing liquid crystal optical elements is greatly improved.

Further, since the liquid crystal/polymer composite material is in a film-like form after curing, there is little possibility of short-circuitting between the substrates by a pressing force or destruction of an active element due to movement of a spacer.

Further, since the liquid crystal/polymer composite material has the same specific resistance as the conventional TN-LCD, it is unnecessary to provide a large storage capacitance for each picture element electrode in contrast to the conventional DSM-LCD. Accordingly, design for the active element is easy; a proportion of the effective surface area of the picture element electrode can be increased, and power consumption rate of the liquid crystal optical element can be reduced.

Further, since the liquid crystal optical element can be produced by eliminating an aligning film forming process in the conventional manufacturing method for TN-LCD, production is easy.

Further, the liquid crystal optical element using the liquid crystal/polymer composite material assures the stable production process and a product satisfying desired performance is obtainable at a high yield.

In the present invention, various applications are possible as far as the effect of the present invention is not reduced.

What is claimed is:

1. A liquid crystal optical element comprising a pair of substrates with electrodes and a liquid crystal/polymer composite material which is composed of a liquid crystal and a polymer and interposed between the pair of substrates, wherein the polymer phase of the liquid crystal/polymer composite material is a polymeric cured product of a polymerizable curable material comprising a high-molecular weight compound having at least one thermo- or photo-polymerizable functional group and an addition-polymerizable compound presented by the following formula (1):

CXY=CZ—CO—O—R—OH     (1)

wherein each of X, Y and Z is —H or —CH$_3$, and R is a bivalent hydrocarbon group which has 4 to 8 carbon atoms in total and at least one carbon atom between the carbon atom bonded to the ester linkage and the carbon atom bonded to the hydroxyl group in the formula (1), and may have at least one linkage selected from the group consisting of an ether linkage, an ester linkage and a carbonate linkage, substituted for one or more carbon—carbon linkages.

2. The liquid crystal optical element according to claim 1, wherein the ratio of the compound represented by the formula (1) to the total addition-polymerizable compounds in the polymerizable curable material is from 10 to 70 wt %.

3. The liquid crystal optical element according to claim 1, wherein R is —$(CH_2)_n$— (wherein n is an integer of from 4 to 8).

4. The liquid crystal optical element according to claim 1, wherein the compound represented by the formula (1) is a hydroxyl group-containing acrylate.

5. A liquid crystal display element comprising an active matrix substrate having an active element for each pixel electrode, a counter electrode substrate having a counter electrode and a liquid crystal/polymer composite material for the liquid crystal optical element defined in claim 1 wherein the liquid crystal/polymer composite material is interposed between the active matrix substrate and the counter electrode substrate.

6. A liquid crystal display element comprising an active matrix substrate having an active element for each pixel electrode, a counter electrode substrate having a counter electrode and a liquid crystal/polymer composite material for the liquid crystal optical element defined in claim 2 wherein the liquid crystal/polymer composite material is interposed between the active matrix substrate and the counter electrode substrate.

7. A liquid crystal display element comprising an active matrix substrate having an active element for each pixel electrode, a counter electrode substrate having a counter electrode and a liquid crystal/polymer composite material for the liquid crystal optical element defined in claim 3 wherein the liquid crystal/polymer composite material is interposed between the active matrix substrate and the counter electrode substrate.

8. A liquid crystal display element comprising an active matrix substrate having an active element for each pixel electrode, a counter electrode substrate having a counter electrode and a liquid crystal/polymer composite material for the liquid crystal optical element defined in claim 4 wherein the liquid crystal/polymer composite material is interposed between the active matrix substrate and the counter electrode substrate.

9. A projection type liquid crystal display apparatus comprising the liquid crystal display element defined in claim 5, a projection light source and a projection optical system.

10. A projection type liquid crystal display apparatus comprising the liquid crystal display element defined in claim 6, a projection light source and a projection optical system.

11. A projection type liquid crystal display apparatus comprising the liquid crystal display element defined in claim 7, a projection light source and a projection optical system.

12. A projection type liquid crystal display apparatus comprising the liquid crystal display element defined in claim 8, a projection light source and a projection optical system.

* * * * *